(12) United States Patent
Albrektsson et al.

(10) Patent No.: US 6,616,093 B1
(45) Date of Patent: Sep. 9, 2003

(54) METHOD AND DEVICE FOR CORRECTING THE TRAJECTORY OF A SPIN-STABILISED PROJECTILE

(75) Inventors: Kjell Albrektsson, Karlskoga (SE); Torsten Wik, Karlskoga (SE); Ulf Hellman, Karlskoga (SE)

(73) Assignee: Bofors Weapon Systems AB (SE)

( * ) Notice: Subject to any disclaimer, the term of this patent is extended or adjusted under 35 U.S.C. 154(b) by 0 days.

(21) Appl. No.: 09/406,778

(22) Filed: Sep. 28, 1999

(51) Int. Cl.⁷ ................................. F42B 10/06
(52) U.S. Cl. ............... 244/3.23; 244/3.27; 244/3.24
(58) Field of Search ............... 244/3.22, 3.11, 244/3.14, 3.28, 3.23, 3.1, 3.24, 3.29, 3.21; 89/1.51

(56) References Cited

U.S. PATENT DOCUMENTS

| 4,655,411 A | 4/1987 | Franzén et al. |
| 5,131,602 A | 7/1992 | Linick ................. 244/3.14 |
| 5,425,514 A * | 6/1995 | Grosso ................. 244/3.22 |
| 5,647,558 A | 7/1997 | Linick ................. 244/3.11 |

\* cited by examiner

*Primary Examiner*—Peter M. Poon
*Assistant Examiner*—Timothy D Collins
(74) *Attorney, Agent, or Firm*—Connolly Bove Lodge & Hutz LLP

(57) ABSTRACT

The present invention relates to a method and a device for correcting the trajectory (7, 8, 10, 11) of a spin-stabilised projectile (12) in azimuth by controlling its rate of spin by devices (18–21) deployable on the outside of the projectile (12) where they act on the airflow.

10 Claims, 4 Drawing Sheets

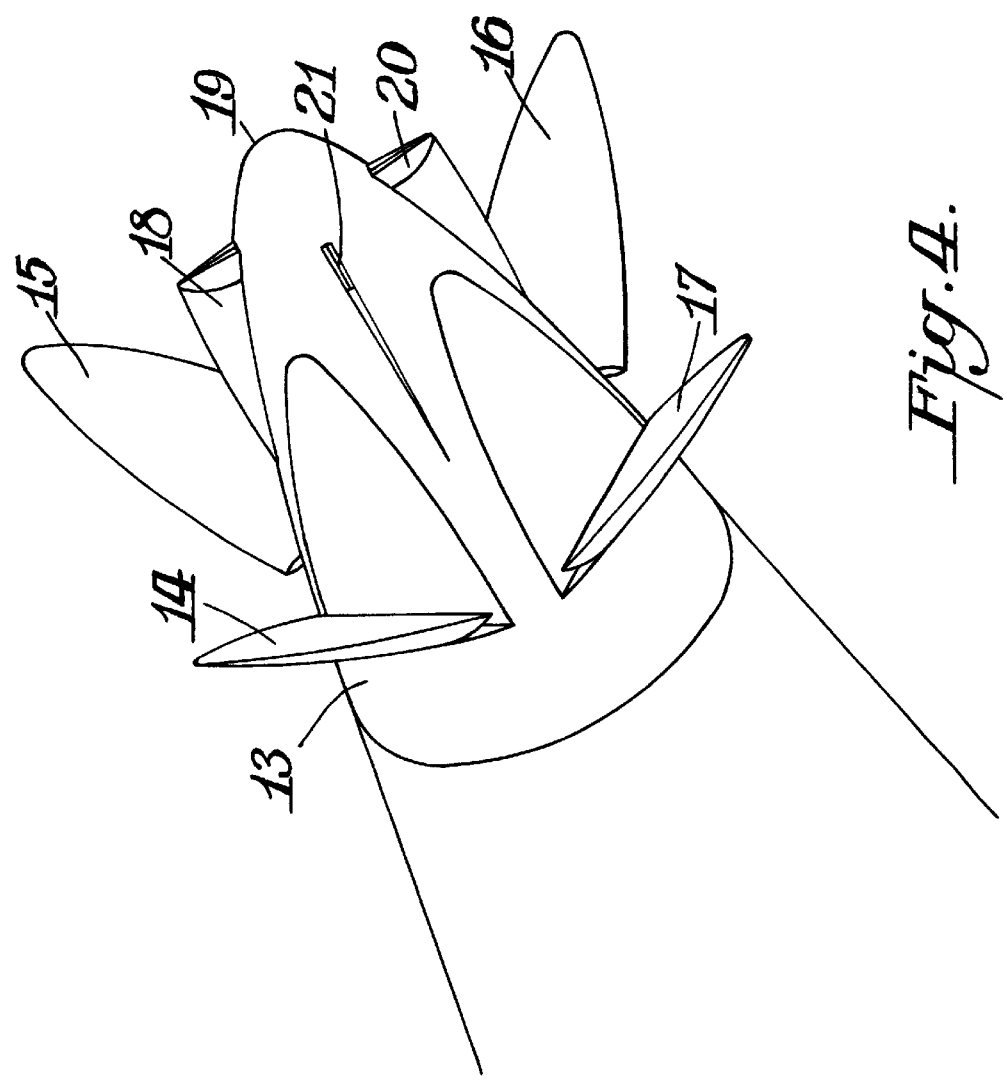

METHOD AND DEVICE FOR CORRECTING THE TRAJECTORY OF A SPIN-STABILISED PROJECTILE

Figure 1:
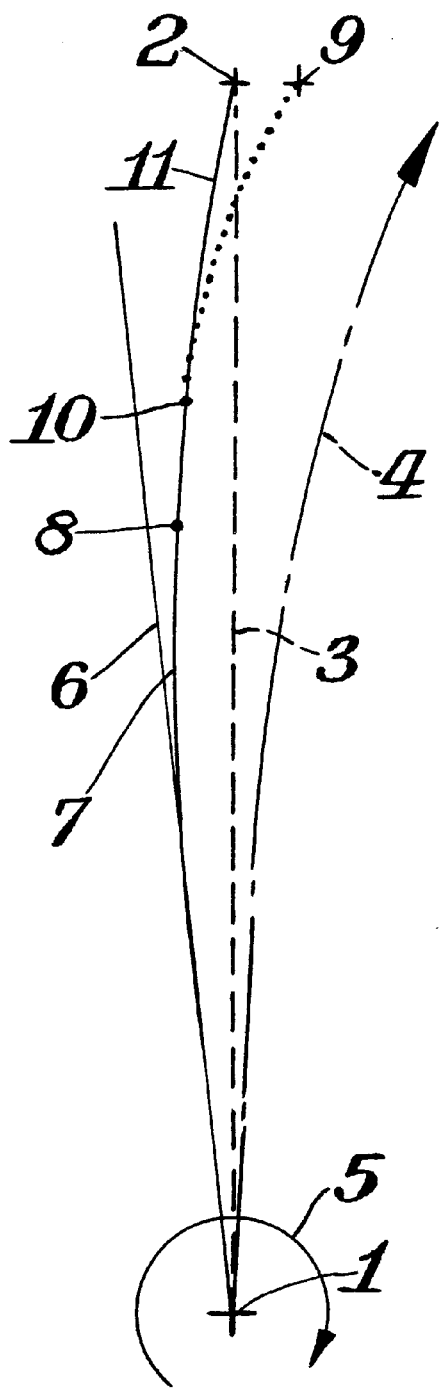

The present invention relates to a method and a device for correcting the trajectory of spin-stabilised projectiles such as artillery shells.

The current trend in artillery technology is to try to extend maximum range while also minimising time at the deployment site after opening fire. The latter is because there are very good methods for rapidly and accurately detecting the deployment site of an artillery gun that is firing or has just fired. In other words, there is a major risk of quick counter fire. One method to minimise the time at the deployment site is to have the required number of shells in the air before the first shell has reached the target. This tactic restricts the opportunity to first fire one or more ranging rounds and subsequently correct elevation and traverse on the basis of their impact points or true position when well out in their trajectory.

The method briefly mentioned above of firing a number of rounds into the air before the first one has reached the target requires a method for correcting the trajectories of the shells other than by fire-based criteria such as muzzle velocity, elevation and traverse.

Since it is generally acknowledged in the field of artillery that longitudinal dispersion is usually greater than lateral dispersion it is natural that initial efforts focused on developing methods for correcting the trajectory longitudinally while the projectiles are still airborne.

Such a method and its associated device are described in Swedish Patent No. 8301651-9 (=U.S. Pat. No. 4,655,411). According to this patent target position is measured, the muzzle velocity of the ammunition unit (the shell) is determined, its position and velocity in trajectory are possibly checked, and on the basis of these values the probable impact point longitudinally, and the deceleration necessary to achieve the correct impact point longitudinally, are computed. A point in time is also computed for activating the available deceleration device to achieve the necessary deceleration to provide the correct range. This procedure thus presupposes that the gun elevation and muzzle velocity selected result in a range that is somewhat too long. It is proposed to achieve the deceleration thus required either by deployable deceleration devices or by blasting parts off the nose cap of the shell to increase its air resistance. Thus to function in the way outlined above, besides being equipped with a deceleration device the shell must also contain a receiver for receiving the necessary commands for trajectory correction and for initiating the deceleration device at the right point in time. Of course, a corresponding technology could be used with a rocket-assisted projectile or shell equipped with base bleed in which the receiver indicated above would initiate the igniter of these devices to achieve the desired increase in range.

As already mentioned no corresponding work has been done as far as we know to develop an elementary method that would function in field conditions for lateral correction of spin-stabilised shells while they are still in trajectory. The purpose of the present invention is to offer such a system.

It has long been known that an aerodynamic effect gives each spin-stabilised projectile a clear tendency to drift laterally from the course imparted to it at launch. The direction in which the projectile drifts is completely dependent on its own direction of spin, while the magnitude of the drift is dependent on the rate of spin of the projectile.

On canons, howitzers, and other gun barrel weapons the rifling in the barrel is traditionally almost always clockwise, i.e. like a standard screw thread but with a completely different pitch. The clockwise spinning shell now has a tendency to drift to the right, i.e. in the same direction as it rotates, compared with the direction it was given when fired. The lateral error that thus arises is well-known, and firing tables used in the field regularly contain corrections to eliminate its effect on the firing result. As already pointed out the range of artillery has been enhanced significantly in recent years while the capability of tracking the trajectory of one's own shells has also been improved. The lateral error built into spin-stabilised shells thus becomes more pronounced as it increases with range, while the capability for stating the trajectory corrections needed is also improving all the time.

As claimed in the present invention it is proposed that one does not only correct for the known aerodynamic effect by a compensation in traverse when firing, but instead exploit this phenomenon for an active correction of the shell's trajectory while the shell is en route to the target.

The most elementary version of the present invention ought to be to have slightly less aim-off to the side of the target than specified in applicable firing tables, and then subsequently when measuring the position of the projectile in trajectory to compute what deceleration of the rate of spin of the projectile is required to enable a hit in the target.

Deceleration of the projectile's rate of spin can be achieved by deployable devices, but as this concerns reducing the rate of spin—not trajectory velocity—the deceleration devices will be of a different design from those indicated in the above mentioned Swedish Patent No. 8301651-9. On the other hand, the method in the present invention for correction of the projectile's trajectory laterally may very well be combined with the method described in that patent for a correction of the same projectile's trajectory longitudinally.

If one combines both these methods it then becomes possible to correct the trajectory of a shell both laterally and longitudinally. The proviso for this is primarily that the shell is equipped with spin and velocity decelerators, and that the shell receiver can receive and initiate deployment of these devices individually at the points in time calculated to provide the desired trajectory correction laterally and longitudinally.

Since the method for measuring the position of a projectile in its ballistic trajectory and the method for computing its point of impact from the value thus obtained, together with the muzzle velocity of the projectile and the training of the barrel in elevation and traverse are well known, they will not be described in any further detail herein.

However, it may be justified to mention that in our own Swedish Patent No. 8600649-1 there is a description of a method and a device involving a shell being equipped with spin retarding devices. At first glance this patent may appear to contain similar concepts to those of the present invention, but in the earlier patent the objective is not to achieve a trajectory correction but merely to adjust the gyro stability of the shell to the actual ballistic trajectory in which it was fired. It is thus a method to reduce dispersion and is not a method for active trajectory correction.

Figure 2:
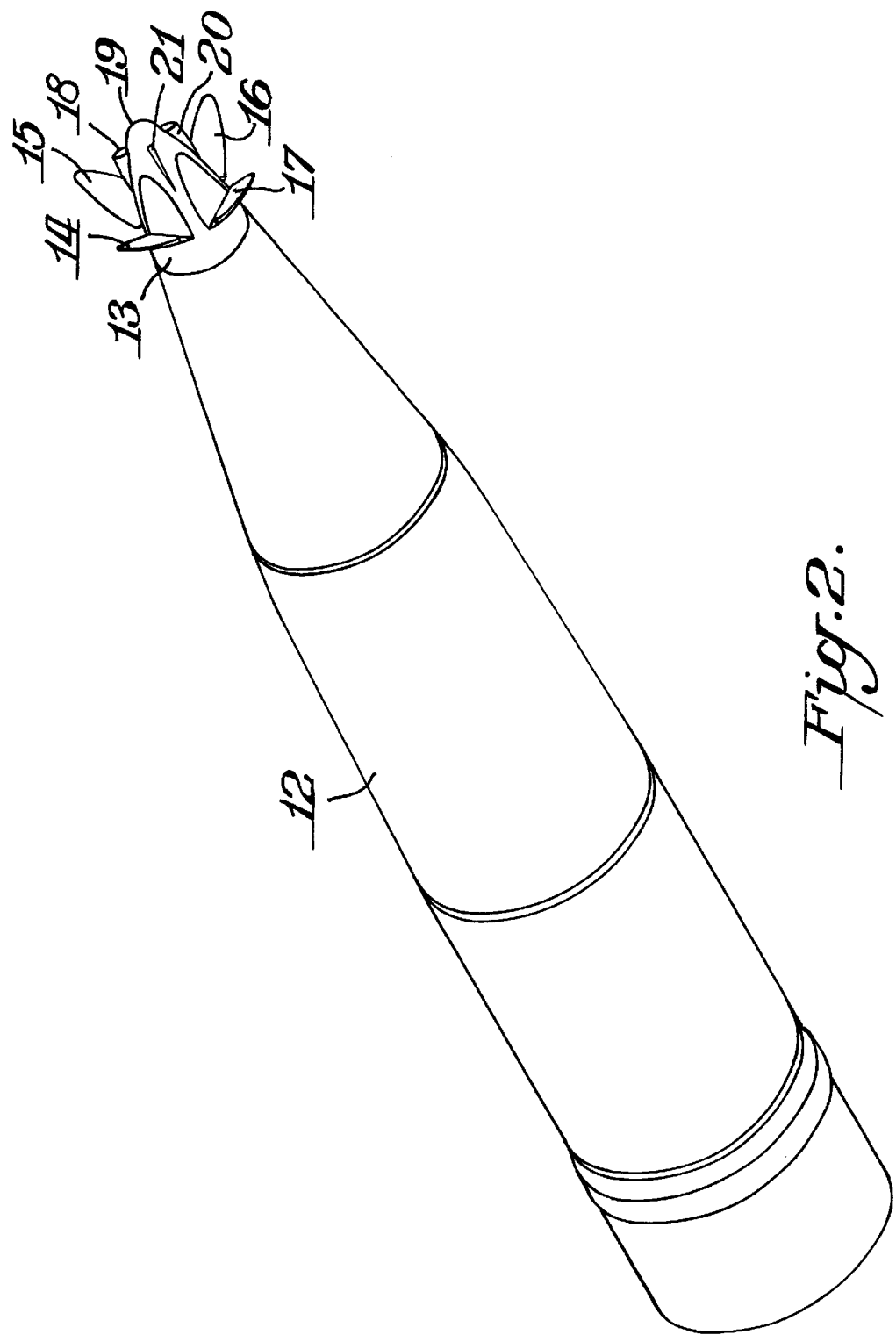
Figure 3:
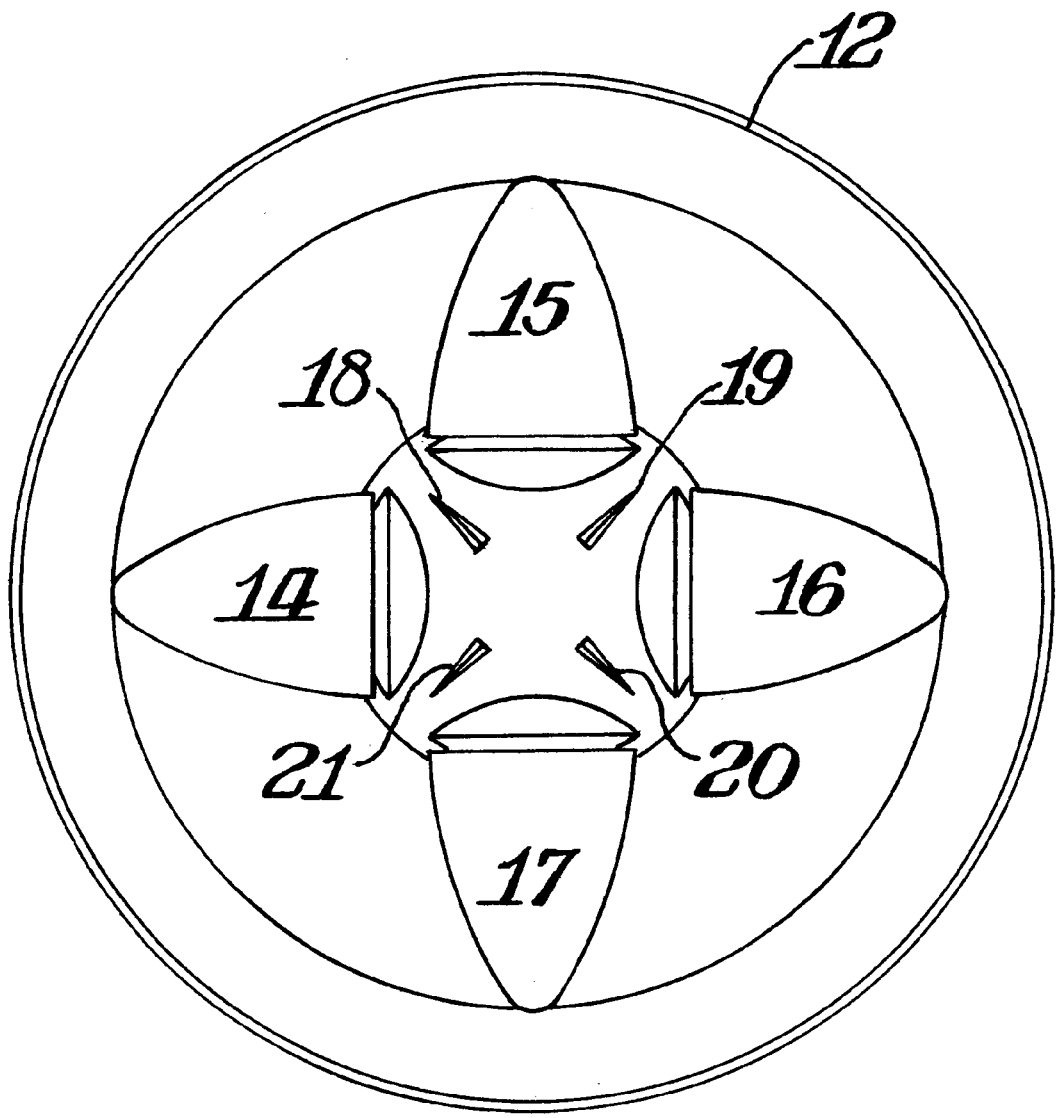

The present invention is defined in the subsequent patent claims, and is described in somewhat more detail in the appended figures in which FIG. 1 rows the basic principle of the present invention, while FIGS. 2–4 show a partially illustrated shell viewed diagonally, viewed from the front to a larger scale, and a view of the nose cap to the same larger scale respectively.

On FIG. 1 item 1 denotes the deployment site and item 2 is the intended target. If the projectile in question is fired from deployment site 1 and is aimed directly at the target 2, i.e. along the broken line 3, then the above mentioned aerodynamic effect would give the projectile the trajectory drift 4. Item 5 denotes that the rifling in the barrel used is clockwise which explains the aforesaid trajectory drift. In the present invention the gun is fired instead with the barrel aimed along line 6, i.e. definitely to the side of the target 2. The aerodynamic spin effect then results in trajectory 7 initially. At checkpoint 8 the position of the projectile in its trajectory is checked and its predicted impact point is computed. As illustrated in the figure, if no corrective action is taken (see the dotted line) the impact point would be at point 9, i.e. to the side of the target. A simultaneous computation shows that a deceleration of the rate of spin by the effect available would enable a hit in the target if the deceleration is activated at point 10 in the trajectory. The receiver in the shell is thus commanded to initiate the deceleration device at point 10. After this the projectile correctly follows the modified trajectory 11 to the target 2. If the computation of the predicted trajectory after point 8 had shown that the impact point would be to the left of the target 2 instead, this could also have been corrected by an increase in the rate of spin of the shell in question.

The other figures show, to two different scales, a shell 12 designed as per the present invention and whose nose cap 13 incorporates four decelerators of flap type 14–17 designed as per the above mentioned Swedish Patent No. 8301651-9 to retard the velocity of the shell in trajectory and thereby restrict its range. These decelerators are illustrated in deployed mode, the mode they assume as soon as the detents (not illustrated in the figures) controlled by the receiver in the shell release the flaps from their original retracted mode.

The spin decelerators 18–21 in the present invention are located between the velocity decelerators 14–17. The spin decelerators 18–21 consist of deployable nubs in the nose cap 13 with sharply ground leading edges which, by being ground against or with the direction of spin of the shell 12, can be made to retard spin or to increase spin by the propeller effect that they impart.

Alternatively the change in the rate of spin can be enabled by inclining the complete surfaces of the nubs, or by enabling the nubs to pivot regarding the angle relative to the airflow which is calculated to achieve the desired effect on the rate of spin of the shell.

The previously mentioned velocity decelerators 14–17 are also deployable and controlled by the receiver in the shell. Deployment can be enabled either by spring force or by centrifugal force.

Another variant has similar decelerators fully deployed initially that affect the rate of spin of the shell immediately it has left the barrel. At a point determined after positional measurement of the shell in trajectory after which the effect of the decelerators is no longer desirable if the shell is to hit the target, the decelerators are ejected by, for example, a small propellant charge inside the shell or a detent releases the decelerators and the airflow and/or centrifugal force detaches them.

The present invention is not restricted to the above mentioned examples but can be varied within the framework of the applicable patent claims.

What is claimed is:

1. A method for lateral correction of a point of impact of spin-stabilised projectiles (12) wherein the difference in azimuth for each projectile between the predicted impact point computed from current data for the projectile at a checkpoint (8) compared with its firing data in the form of muzzle velocity, training in traverse and elevation when fired and the desired point of impact (9) is corrected by influencing and controlling the rate of spin of the projectile.

2. A method as claimed in claim 1 wherein each projectile (12) when fired is aimed to that side (6) of a lateral drift (4) initiated by the projectile's own spin (5) after which the rate of spin of the projectile is corrected on the basis of computations concerning the difference between the computed desired point of impact in the target (2) azimuth and the data computed at checkpoint (8) in the initial trajectory concerning the predicted point of impact (9), such correction being achieved by increasing or reducing the rate of spin of the projectile (12) by means of spin accelerators/decelerators (18–21) deployed from a nose cap (13) of the projectile (12) to affect the airflow around the nose of the projectile (12).

3. A method as claimed in claim 1 wherein the trajectory corrections occur at several points along the trajectory, each one after the performance of measurements to determine the position of the projectile (12) at the checkpoint in the actual trajectory and subsequent computations of the actual future point of impact and the need for correction to enable a hit in the target, as well as the implementation of the aforesaid corrections by reducing or increasing the rate of spin of the projectile (12).

4. A method as claimed in claim 1 wherein the rate of spin of each projectile (12) from a point directly after the muzzle is subjected to a gradual increase or decrease until a point in the trajectory where this change in the rate of spin has been computed as being no longer desirable to achieve a hit in the target.

5. A method as claimed in claim 1 wherein the method in the present invention for lateral correction of the projectile (12) in trajectory (7) is combined with an already known method by which deceleration of the projectile's velocity is used to restrict the range of the projectile to a shorter range than the elevation and muzzle velocity would normally result in.

6. A device for lateral correction of the point of impact in a target (2) for a spin-stabilised projectile (12) comprising devices for firing the projectile in a known theoretical trajectory (6) with known muzzle velocity, elevation and traverse, as well as devices for measuring the position of the target (2) and for input of relevant data for the projectile (12) at a minimum of one predetermined checkpoint in the trajectory (7) together with a device for transmitting actuation commands to the projectile (12) in question and a device for receiving the actuation commands wherein the forward section of the projectile (12) incorporates devices (18–21) protrudable when the receiving device receives the actuation commands and which devices (18–21) when protruding affect the rate of spin of the projectile (12).

7. A device as claimed in claim 6 wherein the projectile (12) involved incorporates two pairs of diametrically arranged deployable devices (18–21), the leading edge of one pair being set to increase the rate of spin of the projectile (12) while the other pair are set to reduce the same rate of spin, either pair being deployable on command.

8. A device as claimed in claim 6 wherein the projectile (12) involved also incorporates devices to influence its velocity in trajectory (7) in addition to devices to influence its rate of spin.

9. A device as claimed in claim 6 wherein the projectile (12) involved incorporates devices (18–21) that initially affect its rate of spin and which on command from a device built into the projectile (12) can be eliminated while the projectile (12) is in trajectory (7) en route to the target (2).

10. A device as claimed in claim 6 wherein the projectile (12) involved incorporates devices (14–21) for influencing its own rate of spin and/or velocity which devices are selectable between different optional functions while the projectile (12) is in trajectory en route to a pre-determined target (2).

* * * * *

UNITED STATES PATENT AND TRADEMARK OFFICE
CERTIFICATE OF CORRECTION

PATENT NO.     : 6,616,093 B1                                        Page 1 of 1
DATED          : September 9, 2003
INVENTOR(S)    : Kjell Albrektsson, Torsten Wik and Ulf Hellman It is certified that error appears in the above-identified patent and that said Letters Patent is hereby corrected as shown below:

Column 4,
Line 2, after the word "a" insert -- target (2) that is opposite to a --.
Line 6, after the word "(2)" insert -- in --.

Signed and Sealed this

Sixth Day of January, 2004

JAMES E. ROGAN
*Director of the United States Patent and Trademark Office*